United States Patent [19]
Ogawa et al.

[11] Patent Number: 5,745,171
[45] Date of Patent: Apr. 28, 1998

[54] DEVICE FOR GENERATING A LUMINANCE SIGNAL FROM A SINGLE FIELD

[75] Inventors: Kimiaki Ogawa; Nobuhiro Tani; Harumi Aoki, all of Itabashi-ku, Japan

[73] Assignee: Asahi Kogaku Kogyo Kabushiki Kaisha, Tokyo, Japan

[21] Appl. No.: 418,572

[22] Filed: Apr. 6, 1995

[30] Foreign Application Priority Data

Apr. 14, 1994 [JP] Japan ................... 6-100532

[51] Int. Cl.⁶ .............. H04N 9/68; H04N 5/247; H04N 9/04
[52] U.S. Cl. ............... 348/234; 348/264; 348/273; 348/279
[58] Field of Search ................ 348/207, 222, 348/234, 238, 262, 264, 279, 362, 273, 274, 275, 272, 235, 236, 237; H04N 5/247, 9/68, 9/04, 9/07, 9/09

[56] References Cited

U.S. PATENT DOCUMENTS

| | | | |
|---|---|---|---|
| 4,054,906 | 10/1977 | Yamanaka | 358/43 |
| 5,099,317 | 3/1992 | Takemura | 358/44 |
| 5,157,499 | 10/1992 | Oguma et al. | 358/213.11 |
| 5,206,717 | 4/1993 | Sakata et al. | 358/43 |
| 5,229,859 | 7/1993 | Sasaki | 358/213.26 |
| 5,289,269 | 2/1994 | Sugimori et al. | 348/264 |
| 5,418,564 | 5/1995 | Aoki | 348/264 |
| 5,442,394 | 8/1995 | Lee | 348/264 |
| 5,543,837 | 8/1996 | Aoki et al. | 348/264 |
| 5,648,817 | 7/1997 | Aoki et al. | 348/264 |

FOREIGN PATENT DOCUMENTS

61-280187  10/1986  Japan .............. H04N 9/04

Primary Examiner—Andrew Faile
Assistant Examiner—Ngoc-Yen Vu
Attorney, Agent, or Firm—Greenblum & Bernstein P.L.C.

[57] ABSTRACT

A luminance signal generating device having two CCDs on which complementary color filters are provided. Each color filter includes a matrix arrangement in which color filter elements for passing magenta, green, yellow and cyan light are arranged in a regular manner. If a first field is read from the CCDs, magenta (Mg) and Green (G) pixel signals of odd-numbered rows are read from the first CCD, and yellow (Ye) and cyan (Cy) pixel signals of even-numbered rows are read from the second CCD. If a second field is read from the CCDs, yellow (Ye) and cyan (Cy) pixel signals of even-numbered rows are read from the first CCD, and magenta (Mg) and green (G) pixel signals of odd-numbered rows are read from the second CCD. Four pixel signals (Mg, G, Ye, Cy) from optically adjacent pixels are added to each other to obtain a luminance signal.

19 Claims, 11 Drawing Sheets

FIRST FIELD

SECOND FIELD

DEVICE FOR GENERATING A LUMINANCE SIGNAL FROM A SINGLE FIELD

BACKGROUND OF THE INVENTION

1. Field of the Invention

The present invention relates to a device for generating a luminance signal based on pixel signals obtained from an imaging device such as a CCD.

2. Description of the Related Art

Conventionally, there is known an imaging device which is provided with a complementary color filter having a matrix arrangement, in which color filter elements for passing magenta light, green light, yellow light and cyan light are arranged in a regular manner. A luminance signal is obtained by adding four pixel signals corresponding to magenta light, green light, yellow light and cyan light obtained from the pixels. Thereafter, photometry calculations or distance measuring calculations are carried out based on the luminance signal thus obtained.

Japanese Unexamined Patent Publication No. 61-280187 shows a construction in which two imaging devices are provided. In this construction, image signals of two fields are outputted from each of the two imaging devices, to obtain four field image signals. A high definition image is thereafter formed in accordance with the four field image signals. If the complementary color filter is provided on each of the two imaging devices, the luminance signal can be obtained by adding the magenta, green, yellow and cyan pixel signals outputted from the two imaging devices. However, the time necessary to obtain the luminance signal by sequentially reading then outputing each of the two field image signals is long, and it subsequently takes too long to perform the required photometry or distance measurements.

SUMMARY OF THE INVENTION

Therefore, an object of the present invention is to provide a luminance signal generating device, by which the luminance signal is generated in a short period of time so that the required photometry and distance measurements can be performed quickly.

According to the present invention, there is provided a luminance signal generating device comprising a first image sensor, a second image sensor, first reading circuit, second reading circuit and a generating circuit.

The first image sensor has a filter, having magenta, green, yellow and cyan filter elements, each of which is arranged in a regular manner in rows of pixels aligned in a horizontal direction and in a vertical direction. The second image sensor has a filter, having magenta, green, yellow and cyan filter elements, each of which is arranged in a regular manner in rows of pixels aligned in a horizontal direction and in a vertical direction. The arrangement filter of each of the first and second image sensors is such that the filter elements of the second image sensor are optically offset in a horizontal direction by the width of one pixel with respect to the filter elements of the first image sensor.

The first reading circuit reads pixel signals outputted from each row of pixels of the first image sensor at every alternate horizontal row. The second reading circuit reads pixel signals outputted from each row of pixels of the second image sensor at every other alternate horizontal row. The horizontal row read by the second reading means is optically adjacent and successive to the horizontal row read by the first reading means. The generating circuit generates a luminance signal by adding the pixel signals read by the first and second reading means.

BRIEF DESCRIPTION OF THE DRAWINGS

The present invention will be better understood from the description of the preferred embodiments of the invention, as set forth below, together with the accompanying drawings in which.

DESCRIPTION OF THE PREFERRED EMBODIMENTS

The present invention will now be described with reference to embodiments shown in the drawings.

Figure 1:
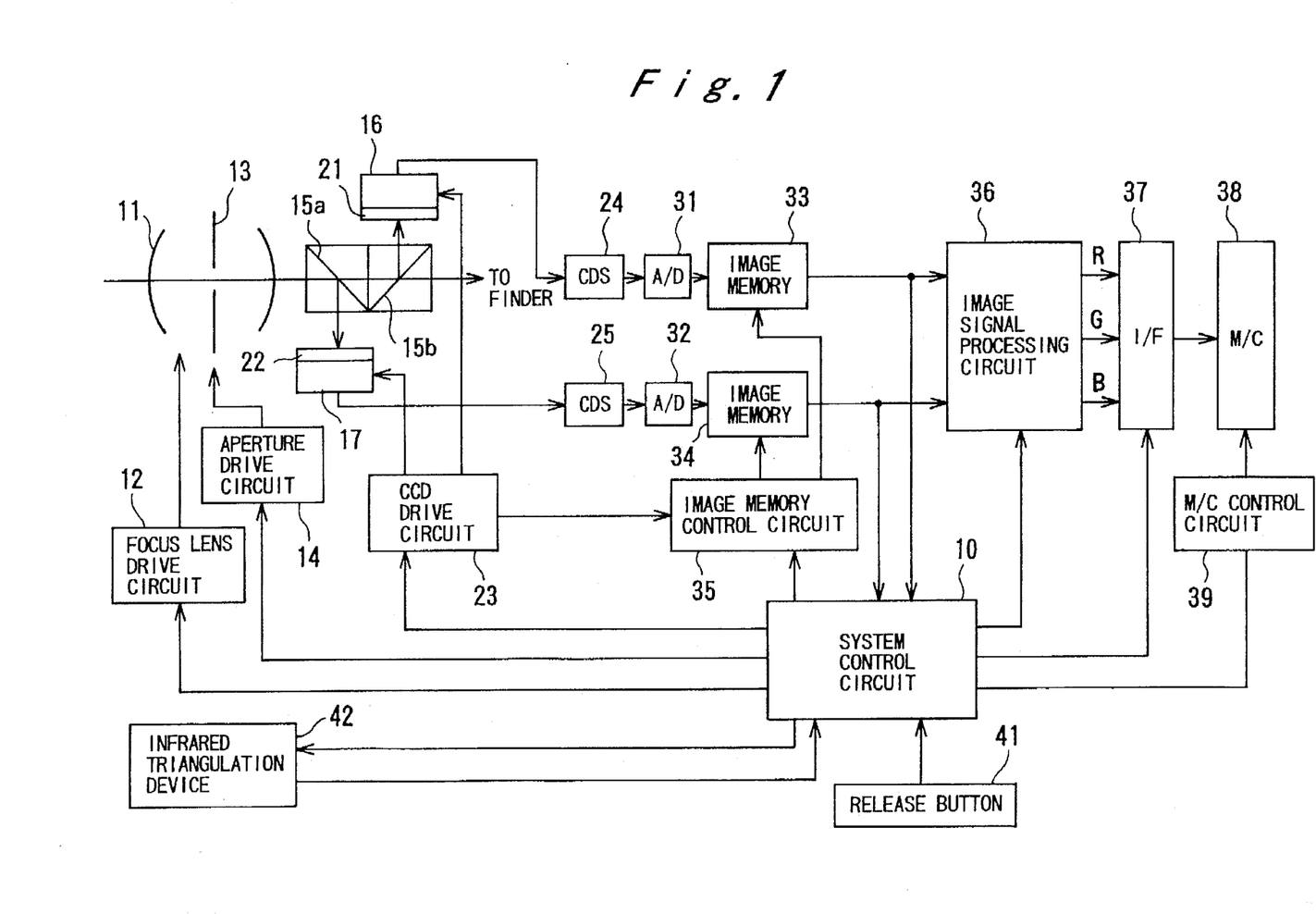
FIG. 1 is a block diagram showing a still-video camera to which an embodiment of a the present invention is applied.

FIG. 1 is a block diagram showing a still-video camera to which an embodiment of the present invention is applied.

Overall, the still-video camera is controlled by a system control circuit 10, which includes a micro-computer.

A focus lens 11 is controlled by a focus lens drive circuit 12 to focus an image of an object to be photographed. An aperture 13 is controlled by an aperture drive circuit 14 to control the exposure, so that the opening degree of the aperture 13 can be adjusted. The focus lens drive circuit 12 and the aperture drive circuit 14 are controlled by the system control circuit 10.

Image light passes through the focus lens 11 and the aperture 13 and is divided by half mirrors 15a and 15b. The portion of the image light passing completely through both of the half mirrors 15a and 15b is led to a view-finder (not shown). The portion of the image light passing through the half mirror 15a that is reflected by the half mirror 15b is led to a first CCD image sensor 16, and the portion of the image light that is reflected by the half mirror 15b is lead to a second CCD image sensor 17. These CCDs 16 and 17 are disposed in such a manner that equivalent images of an object to be photographed are formed on the light receiving surfaces thereof. The CCDs 16 and 17 are solid state imaging devices, and have photodiodes corresponding to pixels aligned in a horizontal and in a vertical direction of a reproduced image plane, so that pixel signals corresponding to the object are generated in the photodiodes.

Color filters 21 and 22 are provided on the first and second CCDs 16 and 17, respectively. The CCDs 16 and 17 are driven by a CCD drive circuit 23 controlled by the system control circuit 10, so that image signals corresponding to the images formed on the CCDs 16 and 17 are supplied to correlation-double-sampling (CDS) circuits 24 and 25.

The image signals inputted to the CDS circuits 24 and 25 are processed so that reset noise is removed, and are then converted to digital signals by A–D converters 31 and 32. The digital image signals are stored in first and second image memories 33 and 34. Each memory 33 and 34 has a storage capacity which is large enough to store image signals corresponding to two fields of image light. Addresses in image memories 33 and 34 where the image signals are stored are controlled by the system control circuit 10 through an image memory control circuit 35.

The image signals read out from the image memories 33 and 34 are inputted into an image signal processing circuit 36, are subjected to predetermined processing and are converted to R-, G- and B-signals. These R-, G- and B-signals are inputted to an interface circuit 37, where each is converted into a signal having a suitable format for recording on a memory card 38. The recording operation for recording the R-, G- and B-signals onto the memory card 38 is carried out by the system control circuit 10 through a memory card control circuit 39.

A release button 41 is connected to the system control circuit 10. When the release button 41 is partly depressed, photometry and distance measurements are performed. When the release button 41 is fully depressed, a recording operation for recording the image signals onto the memory card 38 is carried out. An infrared triangulation device 42 is also connected to the system control circuit 10. As is well known, the infrared triangulation device 42 radiates an infrared beam to an object and detects the reflected infrared beam from the object, and the distance from the camera to the object is found by means of triangulation.

Figure 2:
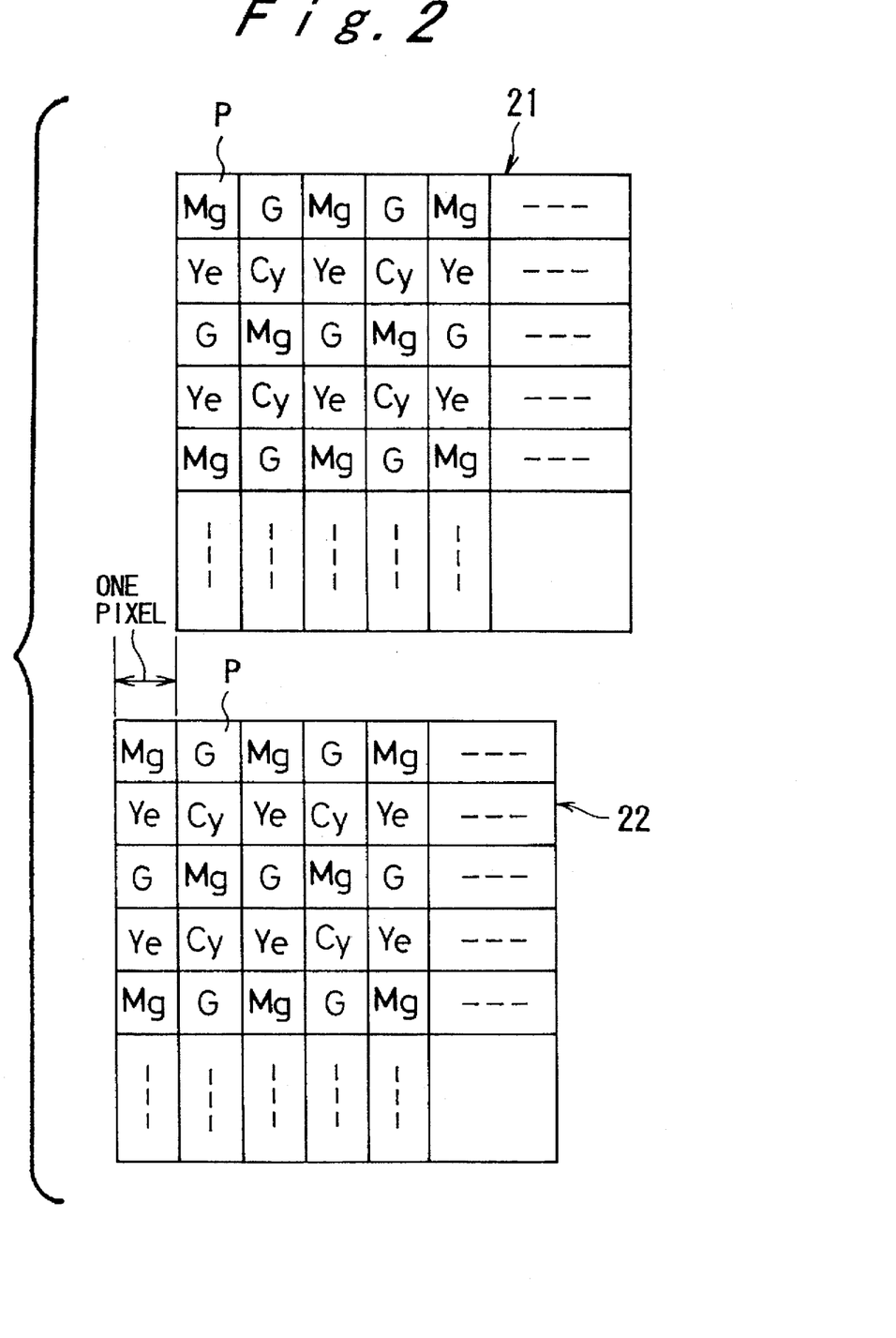
FIG. 2 is a diagram showing arrangements of a first and second color filters disposed on light receiving surfaces of first and second CCDs.

FIG. 2 shows arrangements of the first and second color filters 21 and 22 disposed on the light receiving surfaces of the first and second CCDs 16 and 17. Each of the color filters 16 and 17 is a complementary color filter with a checkerboard (or matrix) arrangement, and both are constructed identically. In color filters 16 and 17, filter elements for passing magenta (Mg), yellow (Ye), cyan (Cy) and green (G) light are arranged alternately in a regular manner. Namely, for every four filter elements, which are arranged in a 2×2 matrix, one each of a magenta (Mg), a green (G), a yellow (Ye) and a cyan (Cy) filter element are provided, each of which has different spectral characteristics from the other.

Comparing the positional relationship of the second color filter 22 with respect to the CCD 17 and the positional relationship of the first color filter 21 with respect to the CCD 16; the second color filter 22 is optically offset by the width of one pixel in a horizontal direction (i.e., leftward in FIG. 2), relative to the CCD 17. Regarding the upper left corner pixel P in the frame formed by filter 21, it may be seen that the element is magenta, for example, in the first color filter 21 while the corresponding element is green in the second color filter 22. Namely, each of the color filter elements of the filter 22 for the second CCD 17 is optically offset in a horizontal direction by the width of one pixel with respect to the color filter elements of the filter 21 for the first CCD 16.

Thus, the spectral characteristics of the CCDs 16 and 17 vary in a regular fashion, in a complementary-color-difference line-sequence. The spectral characteristics of the CCD 17 with the color filter 22 are offset, in a horizontal direction, by the width of one pixel with respect to the spectral characteristics of the CCD 16 with the color filter 21. Therefore, the two pixels which are aligned in a vertical direction of the first CCD 16 and the two pixels which are aligned in a vertical direction of the second CCD 17 and located optically at the same position as the two pixels of the first CCD 16 have different spectral characteristics from each other. Namely, when the first two pixels are Mg and Ye, the other two pixels are G and Cy.

The output signals of the first and second CCDs 16 and 17 are temporarily stored in the image memories 33 and 34 as digital signals, and are then read out from the memories 33 and 34 to be processed by the image signal processing circuit 36. As described below, the signals from the corresponding pixels are superimposed on each other, and an R-signal, a G-signal and a B-signal are obtained and a luminance signal is generated.

Figure 3:
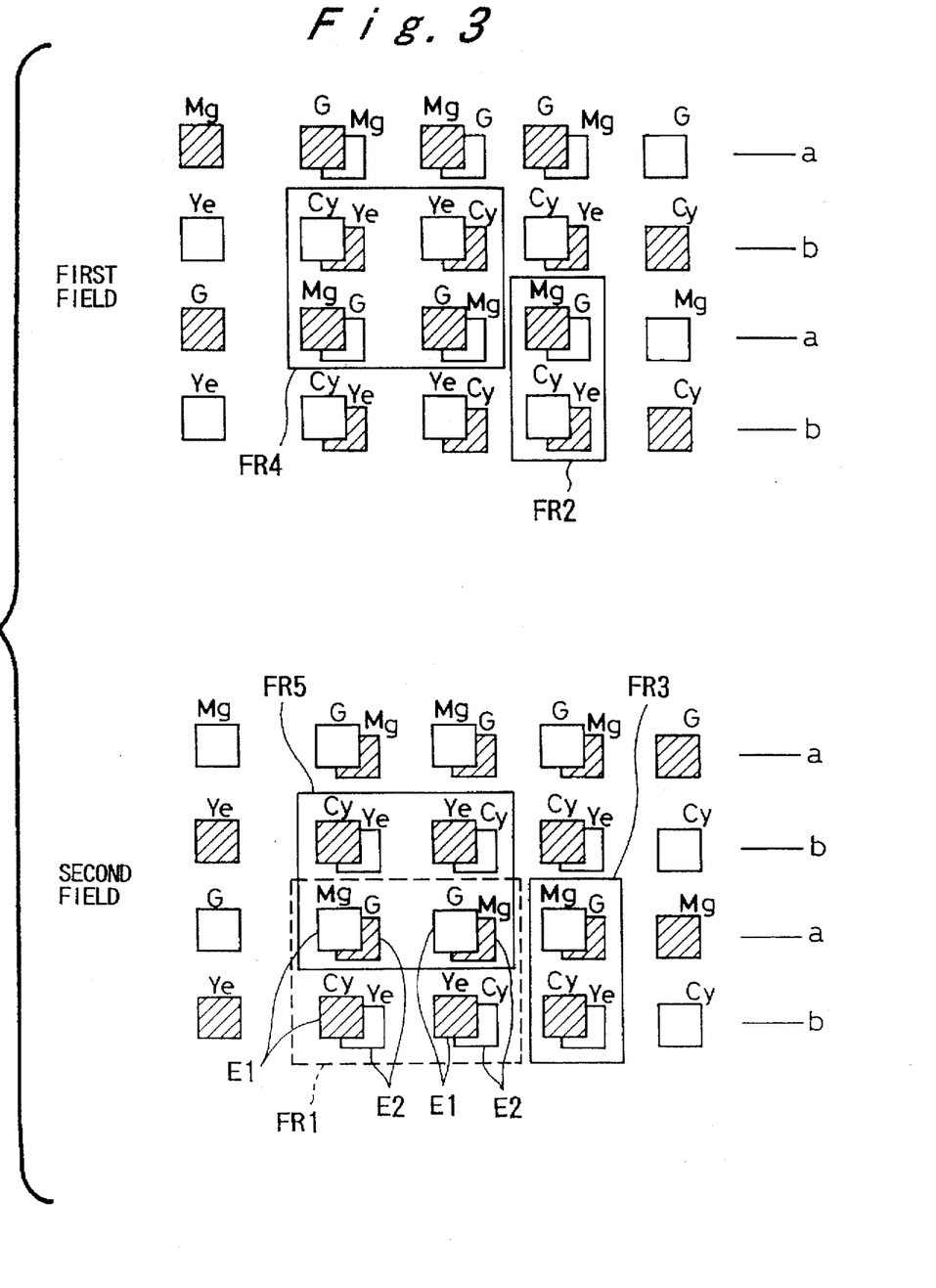
FIG. 3 is a diagram showing a state in which, for output signals of the first and second CCDs, signals from light-sensitive pixel elements corresponding to each other are superimposed on each other.

FIG. 3 shows graphically the corresponding optical superimposition of filter elements. For example, in the frame FR1, the color filter elements E1 placed at the upper side correspond to the filter 21 of the first CCD 16, and the color filter elements E2 placed at the lower side correspond to the filter 22 of the first CCD 17. A magenta (Mg) filter element of the filter 21 and a green (G) filter element of the filter 22 optically cover the same pixel element. Similarly, a green (G) filter element of the filter 21 and a magenta (Mg) filter element of the filter 22 optically cover the same pixel element, a yellow (Ye) filter element of the filter 21 and a cyan (Cy) filter element of the filter 22 optically cover the same pixel element, and a cyan (Cy) filter element of the filter 21 and a yellow (Ye) filter element of the filter 22 optically cover the same pixel element.

In FIG. 3, pixel signals from the pixels covered by the hatched filter elements are simultaneously read out from the CCDs 16 and 17, and the pixel signals from the pixels covered by the unhatched filter elements are not read out from either of the CCDs 16 and 17.

Suppose for example that horizontal rows indicated by the reference "a" in FIG. 3 are odd-numbered, and horizontal rows indicated by the reference "b" are even-numbered. In the first field, pixel signals corresponding to the odd-numbered horizontal rows, numbered from the top row, are read from the first CCD 16, and pixel signals corresponding to even-numbered horizontal rows, numbered from the top row, are read from the second CCD 17. Similarly, in the second field, pixel signals corresponding to even-numbered horizontal rows, numbered from the top row, are read from the first CCD 16, and pixel signals corresponding to odd-numbered horizontal rows, numbered from the top row, are read from the second CCD 17.

Namely, the pixel signals generated in the CCDs 16 and 17 are read successively in a horizontal direction from the first CCD 16, at every alternate horizontal row, and similarly are read successively in a horizontal direction from the second CCD 17, at every other alternate horizontal row. The horizontal rows read from the second CCD 17 are optically adjacent to the horizontal rows read from the first CCD 16.

When a photographed image is recorded on the memory card 38, an R-signal, a G-signal and a B-signal are derived from four pixel signals obtained from the two pixels vertically adjacent to each other and enclosed by frames FR2 and FR3, for example. The derivation of these R-signals, G-signals and the B-signals will be described below later.

Conversely, in making the photometry and distance measurements, a luminance signal is generated from four pixel signals obtained from the four pixels optically arranged horizontally and vertically adjacent to each other and enclosed by for example frames FR4 and FR5. Then, a luminance signal is generated from four pixel signals derived from pixels included in the same field.

In the first field, a luminance signal is generated by adding a magenta (Mg) and a green (G) pixel signal outputted from the first CCD 16, with a yellow (Ye) and a cyan (Cy) pixel signal outputted from the second CCD 17. In the second field, a luminance signal is generated by adding a yellow (Ye) and a cyan (Cy) pixel signal outputted from the first CCD 16, with a magenta (Mg) and a green (G) pixel signal outputted from the second CCD 17. A photometry value is obtained based on an average value of some luminance signals obtained from pixel signals corresponding to the center area of the image.

A distance measurement result is obtained according to a contrast method. This method is based on a comparison of a luminance signal obtained from any first four predetermined pixels located, for example, at the center of the CCD, with luminance signals obtained from eight sets of four pixels positioned around the first four predetermined pixels. The contrast around the first four pixels is then calculated to obtain the distance measurement data.

A method of obtaining the R-signal, the G-signal and the B-signal in an operation in which an image signal is recorded on the memory card 38 will now be described.

It is supposed that the R-signal and the B-signal included in magenta (Mg) are $R_{Mg}$ and $B_{Mg}$; the R-signal and the G-signal included in yellow (Ye) are $R_{Ye}$ and $G_{Ye}$; and the G-signal and the B-signal included in cyan (Cy) are $G_{Cy}$ and $B_{Cy}$. Mg, Ye and Cy are expressed as follows:

$$Mg = R_{Mg} + B_{Mg}; \quad Ye = R_{Ye} + G_{Ye};$$

and $$Cy = G_{Cy} + B_{Cy}.$$

The R-signal (Rs) is obtained from pixel signals derived from four pixels (enclosed by the frame FR2 or FR3 and hatched in FIG. 3) composed of a magenta (Mg) and a yellow (Ye) element aligned in a vertical direction, and a green (G) and a cyan (Cy) element superimposed on the magenta and yellow element, respectively, according to the following equation:

$$\begin{aligned} Rs &= (Mg + Ye) - \alpha(G + Cy) \\ &= R_{Mg} + B_{Mg} + R_{Ye} + G_{Ye} - \alpha G - \alpha G_{Cy} - \alpha B_{Cy} \\ &= R_{Mg} + R_{Ye} + G_{Ye} - \alpha(G + G_{Cy}) + B_{Mg} - \alpha B_{Cy} \\ &= R_{Mg} + R_{Ye}. \end{aligned} \quad (1)$$

To satisfy equation (1):

$$\begin{aligned} \alpha &= G_{Ye}/(G + G_{Cy}) \\ &= B_{Mg}/B_{Cy}. \end{aligned}$$

The B-signal (Bs) is obtained by the following equation, similar to the above. Namely:

$$\begin{aligned} Bs &= (Mg + Cy) - \beta(G + Ye) \\ &= R_{Mg} + B_{Mg} + G_{Cy} + B_{Cy} - \beta G - \beta R_{Ye} - \beta G_{Ye} \\ &= R_{Mg} + B_{Cy} + G_{Cy} - \beta(G + G_{Ye}) + B_{Mg} - \beta R_{Ye} \\ &= B_{Mg} + B_{Cy}. \end{aligned} \quad (2)$$

To satisfy equation (2):

$$\beta = G_{Cy}/(G + G_{Ye}) = R_{Mg}/R_{Ye}.$$

The G-signal (Gs) is obtained from the luminance signal (Y), Rs and Bs obtained by the equations (1) and (2):

$$\begin{aligned} Gs &= Y - Rs - Bs \\ &= (Mg + Cy + G + Ye) - Rs - Bs \\ &= G + G_{Ye} + G_{Cy}. \end{aligned} \quad (3)$$

Figure 4:
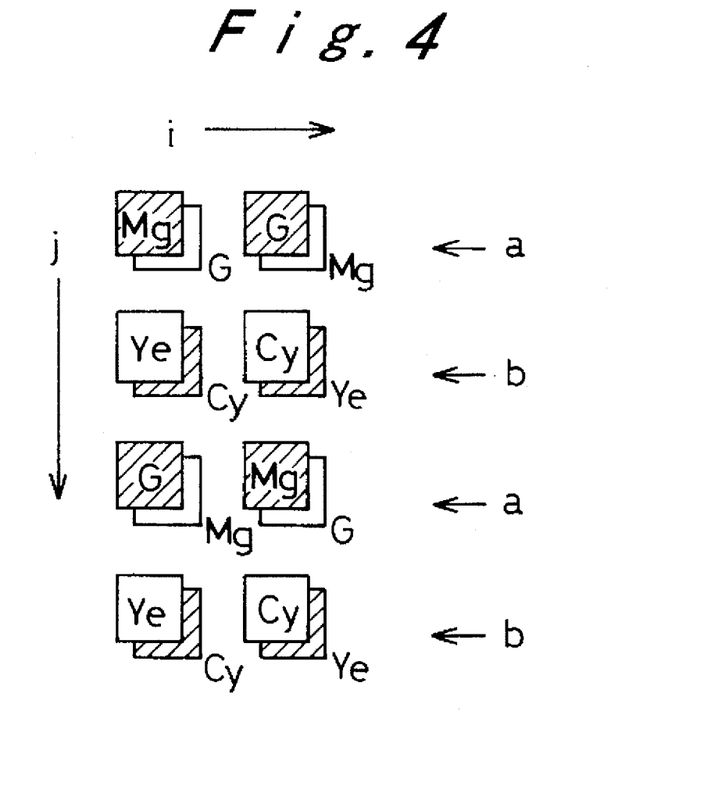
FIG. 4 is a diagram showing a manner of sensing the color signals.

With reference to FIG. 4, a practical way of sensing the R-signal, the G-signal and the B-signal will be described below. Note, in this embodiment a frame image is formed according to the frame mode, in which one frame is composed of both a first field and a second field.

In the pixel arrangement shown in FIGS. 3 and 4, the horizontal direction is indicated by the parameter "i" and the vertical direction is indicated by the parameter "j". Note, in these drawings, a pixel positioned at the upper side of the superimposed pixels corresponds to the first CCD 16, and a pixel positioned at the lower side of the superimposed pixels corresponds to the second CCD 17. Further, in this drawing, the hatched pixels correspond to the first field, and the unhatched pixels correspond to the second field.

In the following expressions, the first and second CCDs are distinguished by the parameter "A" and "B" respectively. In the first CCD 16, the pixels are arranged in such a manner that signals correspond to the pixels as follows:

| | | | |
|---|---|---|---|
| $VA, i, j$ | $= Mg,$ | $VA, i+1, j$ | $= G;$ |
| $VA, i, j+1$ | $= Ye,$ | $VA, i+1, j+1$ | $= Cy;$ |
| $VA, i, j+2$ | $= G,$ | $VA, i+1, j+2$ | $= Mg;$ and, |
| $VA, i, j+3$ | $= Ye,$ | $VA, i+1, j+3$ | $= Cy;$ | wherein $VA, i, j$, etc., are pixel signals, $i = 1, 3, 5, \ldots$; and, $j = 1, 5, 9, 13, \ldots$ In the second CCD 17, the pixels are arranged in such a manner that signals correspond to the pixels as follows:

| | | | |
|---|---|---|---|
| $VB, i, j$ | $= G,$ | $VB, i+1, j$ | $= Mg;$ |
| $VB, i, j+1$ | $= Cy,$ | $VB, i+1, j+1$ | $= Ye;$ |
| $VB, i, j+2$ | $= Mg,$ | $VB, i+1, j+2$ | $= G;$ and, |
| $VB, i, j+3$ | $= Cy,$ | $VB, i+1, j+3$ | $= Ye;$ | wherein $VB, i, j$, etc., are pixel signals, $i = 1, 3, 5, \ldots$; and, $j = 1, 5, 9, 13, \ldots$ In a first scanning operation, signals of the first field, namely:

| | | | |
|---|---|---|---|
| $VA, i, j$ | $= Mg,$ | $VA, i+1, j$ | $= G;$ |
| $VA, i, j+2$ | $= G,$ | $VA, i+1, j+2$ | $= Mg;$ |
| $VB, i, j+1$ | $= Cy,$ | $VB, i+1, j+1$ | $= Ye;$ and, |
| $VB, i, j+3$ | $= Cy,$ | $VB, i+1, j+3$ | $= Ye;$ | are sensed, and in a second scanning, signals of the second field, namely:

$VA,i,j+1 = Ye,$  $VA,i+1,j+1 = Cy;$
$VA,i,j+3 = Ye,$  $VA,i+1,j+3 = Cy;$
$VB,i,j = G,$  $VB,i+1,j = Mg;$ and,
$VB,i,j+2 = Mg,$  $VB,i+1,j+2 = G;$ are sensed.

All the pixel signals obtained by the first and second scan are stored in the image memories 33 and 34. These pixel signals are read and inputted into the image signal processing circuit 36, and thus, the R-signal, the G-signal and the B-signal of the ith pixel of each scanning row of the odd-number fields are obtained by a calculation, as follows:

$$Ri,k = (VA,i,j + VA,i,j+1) - \alpha(VB,i,j + VB,i,j+1) \quad (4)$$
$$= (Mg + Ye) - \alpha(G + Cy);$$

$$Ri,k+1 = (VB,i,j+2 + VA,i,j+3) - \alpha(VA,i,j+2 + VB,i,j+3) \quad (5)$$
$$= (Mg + Ye) - \alpha(G + Cy);$$

$$Bi,k = (VA,i,j + VB,i,j+1) - \beta(VB,i,j + VA,i,j+1) \quad (6)$$
$$= (Mg + Cy) - \beta(G + Ye);$$

$$Bi,k+1 = (VB,i,j+2 + VB,i,j+3) - \beta(VA,i,j+2 + VA,i,j+3) \quad (7)$$
$$= (Mg + Cy) - \beta(G + Ye);$$

$$Gi,k = (VA,i,j + VA,i,j+1 + VB,i,j + VB,i,j+1) - \quad (8)$$
$$pRi,k - qBi,k$$
$$= (Mg + Ye + G + Cy) - pRi,k - qBi,k;$$

and, $$Gi,k+1 = (VB,i,j+2 + VA,i,j+3 + VA,i,j+2 + VB,i,j+3) - \quad (9)$$
$$pRi,k+1 - qBi,k+1$$
$$= (Mg + Ye + G + Cy) - pRi,k+1 - qBi,k+1.$$

Similarly, the R-signal, the G-signal and the B-signal of the (i+1)th pixel of each scanning row of the odd-number fields are obtained by a calculation, as follows:

$$Ri+1,k = (VB,i+1,j + VB,i+1,j+1) - \alpha(VA,i+1,j + VA,i+1,j+1) \quad (10)$$
$$= (Mg + Ye) - \alpha(G + Cy);$$

$$Ri+1,k+1 = (VA,i+1,j+2 + VB,i+1,j+3) - \alpha(VB,i+1,j+2 + VA,i+1,j+3) \quad (11)$$
$$= (Mg + Ye) - \alpha(G + Cy);$$

$$Bi+1,k = (VB,i+1,j + VA,i+1,j+1) - \beta(VA,i+1,j + VB,i+1,j+1) \quad (12)$$
$$= (Mg + Cy) - \beta(G + Ye);$$

$$Bi+1,k+1 = (VA,i+1,j+2 + VA,i+1,j+3) - \beta(VB,i+1,j+2 + VB,i+1,j+3) \quad (13)$$
$$= (Mg + Cy) - \beta(G + Ye);$$

$$Gi+1,k = (VB,i+1,j + VB,i+1,j+1 + VA,i+1,j + VA,i+1,j+1) - \quad (14)$$
$$pRi+1,k - qBi+1,k$$
$$= (Mg + Ye + G + Cy) - pRi+1,k - qBi+1,k;$$

and, $$Gi+1,k+1 = (VA,i+1,j+2 + VB,i+1,j+3 + VB,i+1,j+2 + VA,i+1,j+3) - \quad (15)$$
$$pRi+1,k+1 - qBi+1,k+1$$
$$= (Mg + Ye + G + Cy) - pRi+1,k+1 - qBi+1,k+1.$$

Note, as shown in equation (3), "p" and "q" may be equal to 1, respectively. However, it is preferable that these parameters be adjusted to a suitable value in accordance with the luminance component. The constants $\alpha$, $\beta$, "p" and "q" are set by adjusting parameters in the software executed by the system control circuit 10.

For the even-number fields, the R-signal, the G-signal and the B-signal are obtained with equations similar to equations (4) through (15), where the pixels being added are numbered (j+1)th and (j+2)th.

Note, the above equations show linear calculations in which gamma correction is not carried out. Conversely, when signals on which preliminary gamma correction has been carried out are stored in the memories 33 and 34, the signals are converted to linear signals, calculation of the above equations is carried out, and then regular gamma correction is performed.

Figure 5:
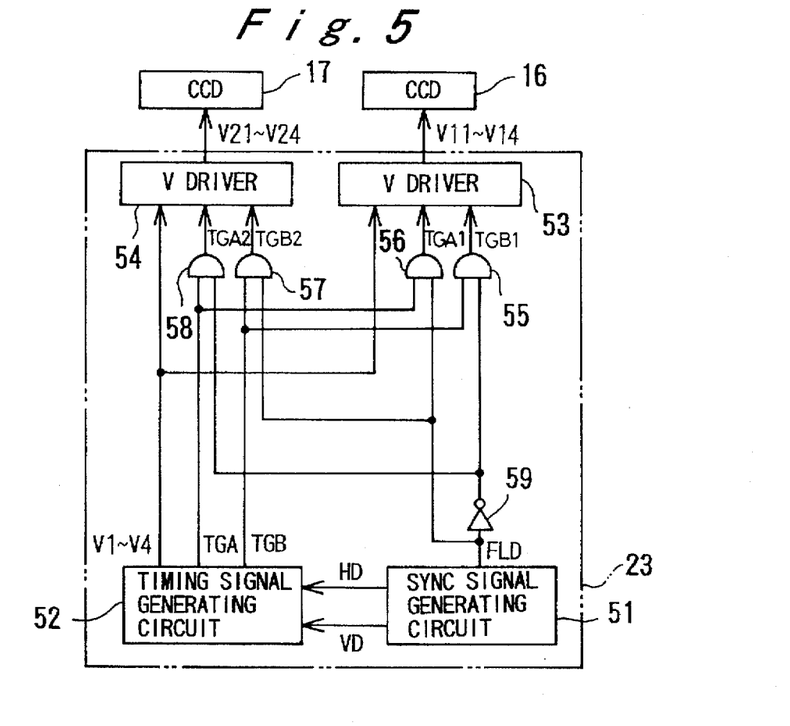
FIG. 5 is a diagram showing a circuit included in a CCD drive circuit by which pixel signals are read row by row.
Figure 6:
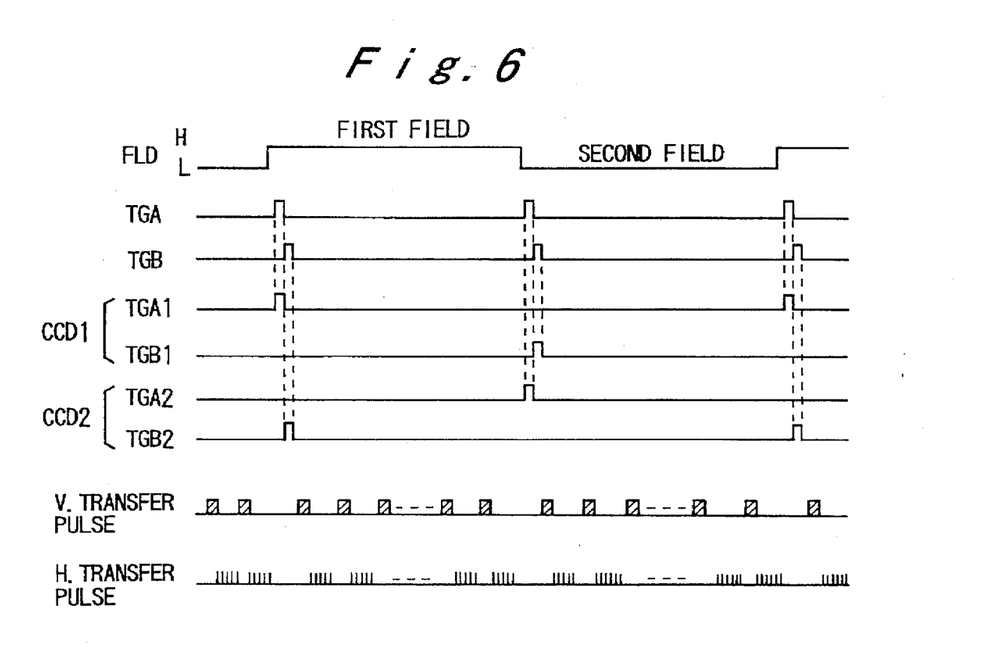
FIG. 6 is a timing chart showing an operation in which pixel signals are read row by row.

With reference to FIGS. 5 and 6, a construction and an operation for reading pixel signals successively row by row from the CCD 16 and 17 will be described. FIG. 5 shows a circuit included in the CCD drive circuit 23 (FIG. 1) by which pixel signals are read row by row, and FIG. 6 shows an operation in which pixels signals are read row by row.

In FIG. 5, a synchronizing signal generating circuit 51 outputs a field signal FLD, a horizontal synchronizing signal HD and a vertical synchronizing signal VD. A timing signal generating circuit 52 generates transfer gate signals TGA and TGB, and vertical transfer pulses V1 through V4, based on the horizontal and vertical synchronizing signals HD and VD. The transfer gate signals TGA and TGB correspond to transferring pixel signals from each row "a" to a vertical transfer CCD, and transferring pixel signals from each row "b" to a vertical transfer CCD, respectively.

An output terminal of a first vertical driver 53 is connected to the first CCD 16, and an output terminal of a second vertical driver 54 is connected to the second CCD 17. Input terminals of the first vertical driver 53 are connected to the timing signal generating circuit 52, and AND gates 55 and 56, while input terminals of the second vertical driver 54 are connected to the timing signal generating circuit 52, and AND gates 57 and 58. The FLD signal outputted from the synchronizing signal generating circuit 51 is inputted into the AND circuits 55 and 58 through an inverter 59, and directly into the AND circuits 56 and 57. The transfer gate signal TGB outputted from the timing signal generating circuit 52 is inputted into the AND circuits 55 and 57, and the transfer gate signal TGA is inputted into the AND circuits 56 and 58.

As shown in FIG. 6, the field signal FLD is made high (H) during the first field, and low (L) during the second field. When the field signal FLD is changed to (H) to set the first field, the transfer gate signals TGA and TGB are outputted from the timing signal generating circuit 52 successively and in synchronization with the vertical synchronization signal VD. The AND circuits 56 and 57 receive (H) signals from the synchronizing signal generating circuit 51; the AND circuit 56 receives the transfer gate signal TGA from the timing signal generating circuit 52; and the AND circuit 57 receives the transfer gate signal TGB from the timing signal generating circuit 52. Therefore, the AND circuits 56 and 57 output transfer gate signals TGA1 and TGB2 in succession and the signals are mutually phase-shifted. Regarding the AND circuits 55 and 58, since the (L) signal is inputted therein through the inverter 59, they do not output the transfer gate signals TGB1 nor TGA2.

Figure 13:
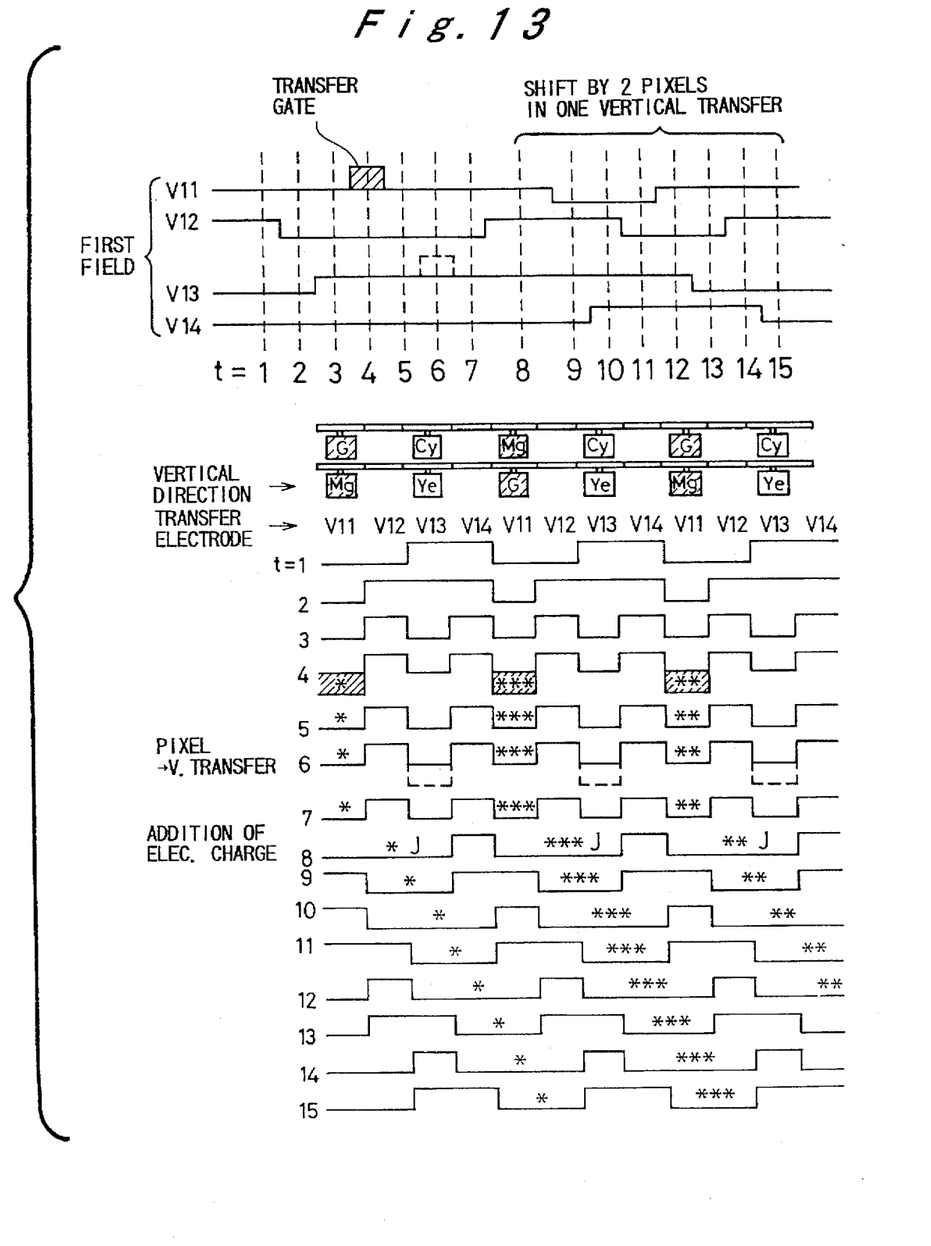

The transfer gate signal TGAI and the vertical transfer pulses V1 through V4 inputted from the timing signal generating circuit 52 are synthesized and level-shifted by the first vertical driver 53, so that vertical transfer pulses V11 through V14 are outputted from the first vertical driver 53 (see, FIG. 13). In the first CCD 16, pixel signals are transmitted from the photodiodes to a vertical transfer CCD in accordance with the timing transfer gate signal TGA1, and in vertical transfer is performed. Similarly, in the second CCD 17, pixel signals are transmitted from the photodiodes to a vertical transfer CCD, and a vertical transfer is again performed, under control of the second vertical driver 54. Therefore, in the first field, pixel signals of the horizontal rows indicated by the reference "a" are read from the first CCD 16, and, pixel signals of the horizontal rows indicated by the reference "b" are read from the second CCD 17 simultaneously (see, FIG. 3).

When the field signal FLD is changed to (L) to set the second field (in FIG. 6), the vertical transfer of pixel signals is performed in the CCDs 16 and 17, similarly as described above. Namely, the transfer gate signals TGA2 and TGB1 are outputted successively and slightly mutually phase-shifted, so that pixel signals of the horizontal rows indicated by the reference "a" are transmitted from the photodiodes to a vertical transfer CCD in accordance with the timing transfer gate signal TGA2 in the second CCD 17, and pixel signals of the horizontal rows indicated by the reference "b" are transmitted from photodiodes to a vertical transfer CCD in accordance with the timing transfer gate signal TGB1 in the first CCD 16. Then, the vertical transfer is performed based on operation of the vertical transfer pulses V11 through V14, and V21 through V24. Therefore, in the second field, pixel signals of the horizontal rows indicated by the reference "a" are read out from the CCD 17, and, pixel signals of the horizontal rows indicated by the reference "b" are read out from the CCD 16 simultaneously.

With reference to FIGS. 7 through 11, a photographing operation of the embodiment will be described.

Figure 7:
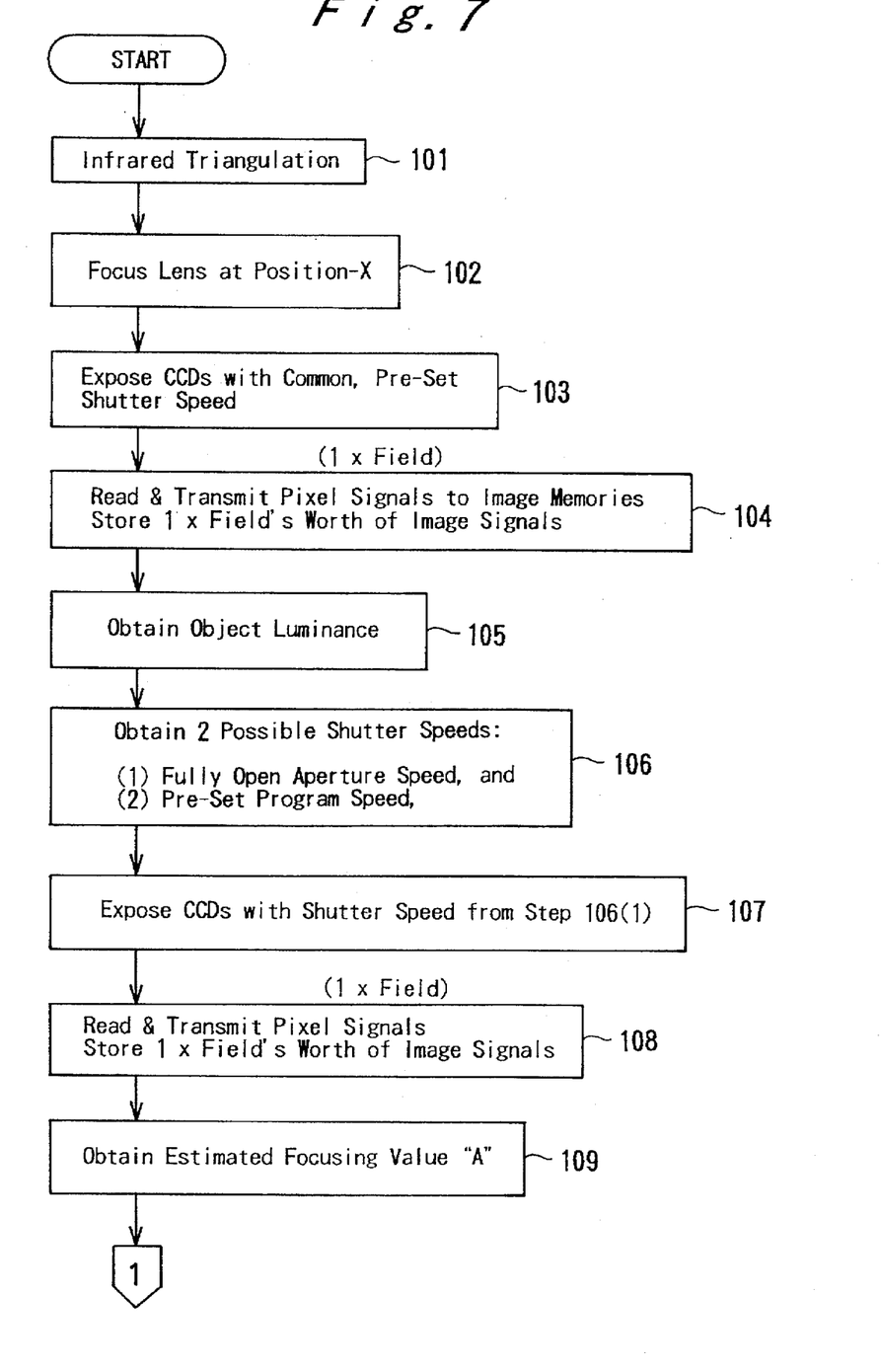
FIG. 7 is the first part of a flow chart of a program by which a photometry and a distance measurement are performed.
Figure 8:
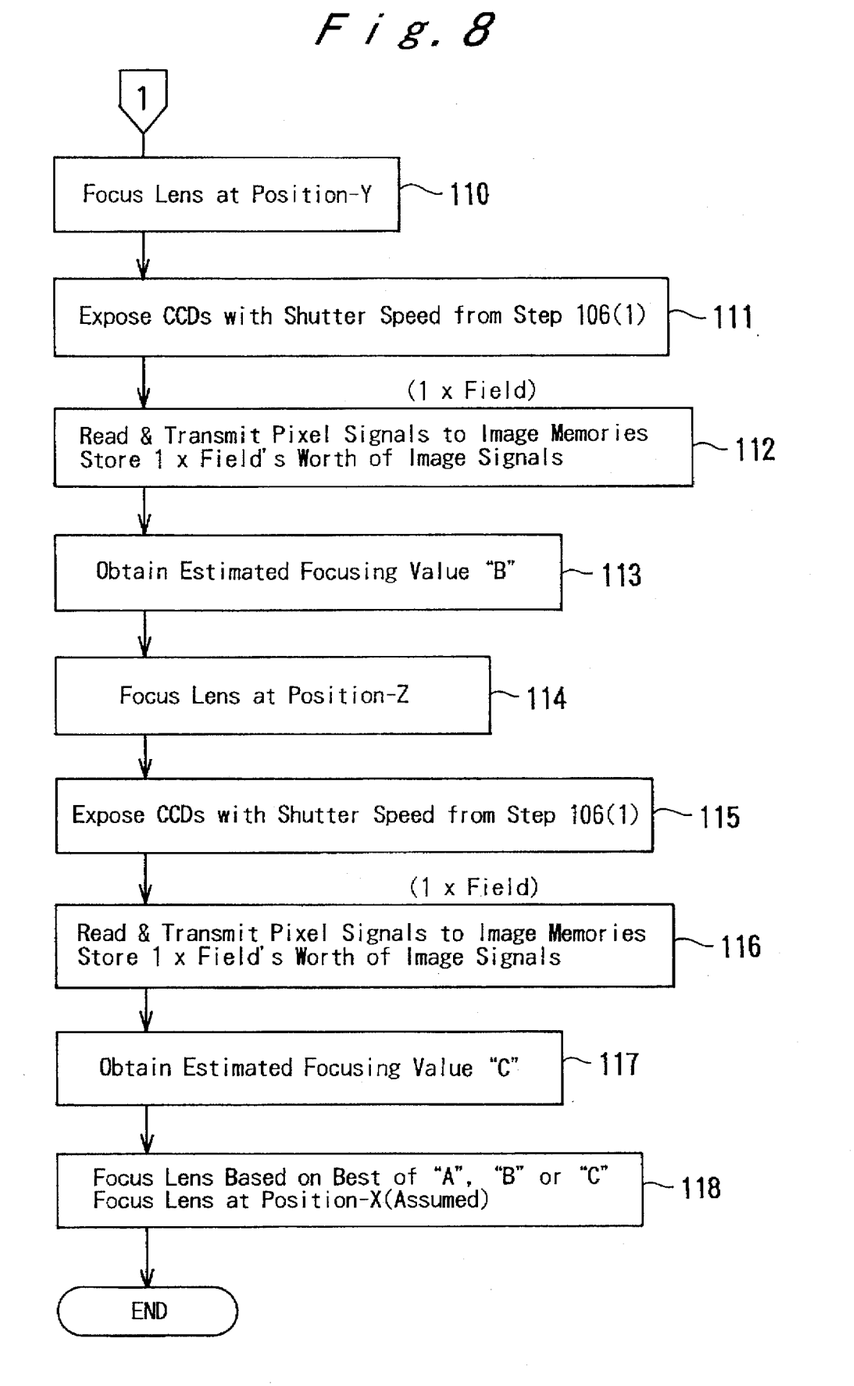
FIG. 8 is the second part of the flow chart of the program.
Figure 9:
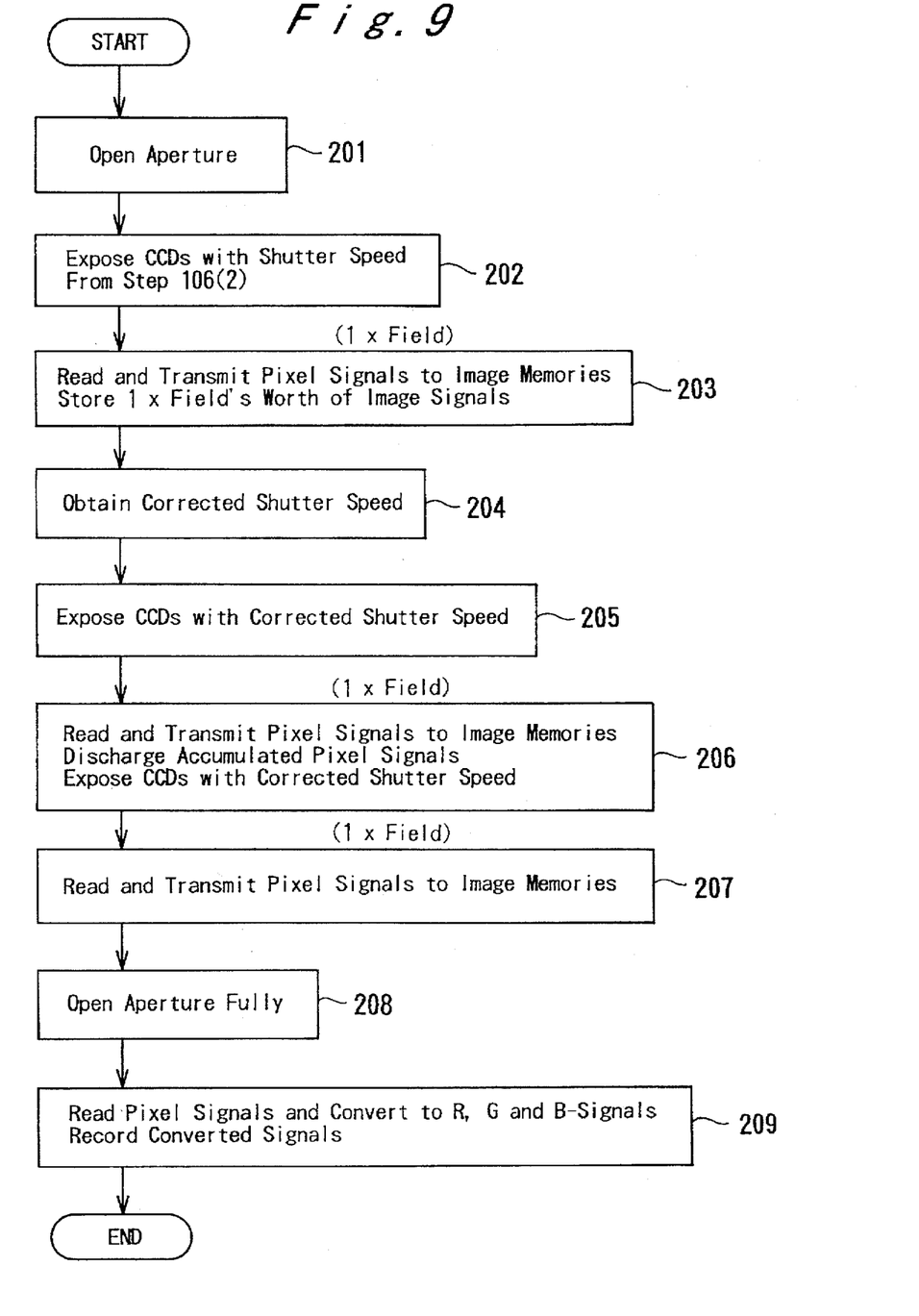
FIG. 9 is a flow chart of a program of an operation in which an image signal is recorded on a memory card.
Figure 10:
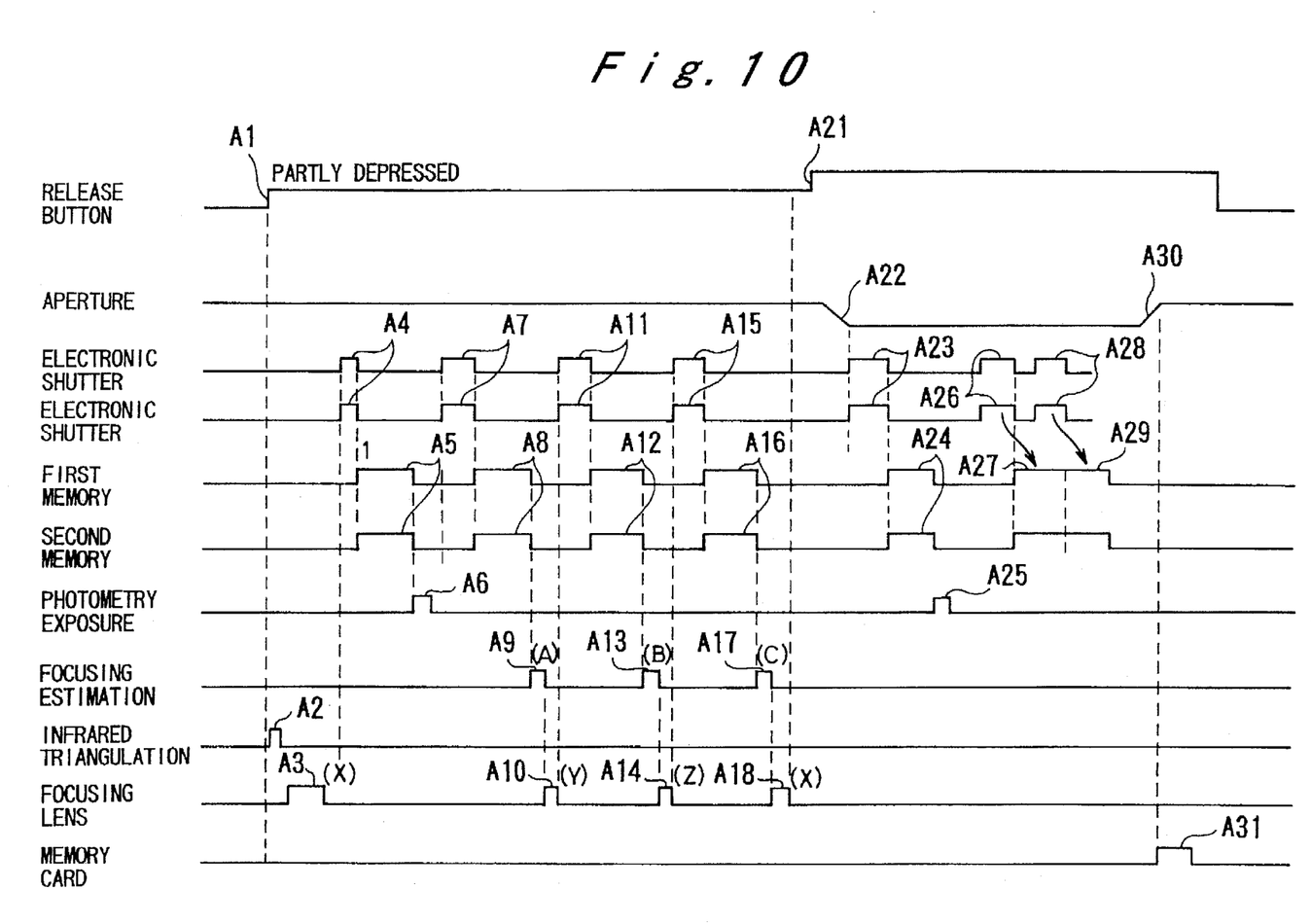
FIG. 10 is a timing chart of a photographing operation.
Figure 11:
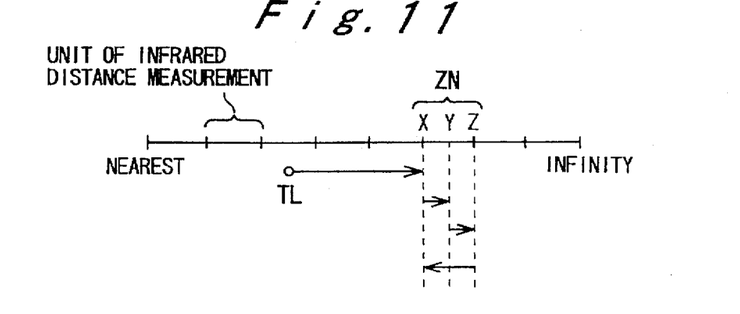
FIG. 11 is a diagram showing the movement of a focusing lens in an autofocus (AF) operation.

FIGS. 7 and 8 show a flow chart by which distance and photometry measurements are carried out. FIG. 9 shows a flow chart by which image signals are recorded in a memory card. FIG. 10 shows a timing chart of the photographing operation. FIG. 11 shows movement of the focus lens in an automatic focusing (AF) operation.

Execution of the distance and photometry measurement program shown in FIGS. 7 and 8 is started when the release button 41 is partly depressed (reference A1 in FIG. 10). In Step 101, infrared triangulation is performed by the infrared triangulation device 42 (reference A2 in FIG. 10), so that the distance from the still video camera to the object is measured. The accuracy of the infrared triangulation corresponds to the "unit of infrared distance measurement" marked on the horizontal axis shown in FIG. 11, and is coarser than the accuracy of the distance measurement using the CCDs 16 and 17 described later. When it is determined as a result of the infrared triangulation that the focusing lens 11 should be positioned corresponding to the infrared distance measuring zone ZN to focus on the object, in Step 102, the focusing lens 11 is moved from the present position thereof (reference TL) to focus on position X the nearer (with respect to the present position TL) of the two positions defined by the plus and minus limits (X, Z) of the unit measurement value within the infrared distance measuring zone ZN (reference A3).

In Steps 103 through 105, a photometry measurement is performed in during which the aperture 13 is set at the fully open position. In this photometry operation, magenta (Mg), green (G), yellow (Ye) and cyan (Cy) pixel signals read from the first and second CCDs 16 and 17 are added to each other to generate a luminance signal.

In Step 103, each of the first and second CCDs 16 and 17 are exposed at a predetermined electronic shutter speed which is common to both (reference A4). In Step 104, image signals derived from pixel signals obtained from the first and second CCDs 16 and 17 are transmitted into the first and second image memories 33 and 34 (reference A5). If the first field is read, pixel signals of horizontal rows "a" (odd-numbered rows) of the first CCD 16 and of the horizontal rows "b" (even-numbered rows) of the second CCD 17 are transmitted into the image memories 33 and 34. If the second field is read, pixel signals of horizontal rows "b" (even-numbered rows) of the first CCD 16 and of horizontal rows "a" (odd-numbered rows) of the second CCD 17 are transmitted into the image memories 33 and 34. Thus, one field's worth of image signals are stored as photometry data in each of the image memories 33 and 34.

In Step 105, an object luminance is obtained using predetermined data included in the photometry data stored in the image memories 33 and 34. Namely, the object luminance is obtained based on the average values of some luminance signals obtained from pixels located, for example, at the center area of the frame (reference A6).

In Step 106, based on the object luminance obtained in Step 105 and the sensitivities of the CCDs 16 and 17, two possible electronic shutter speeds by which the proper exposure could be attained are obtained. Namely:

(1) an electronic shutter speed in a state in which the aperture is in a fully open position is obtained; and (2) an aperture and an electronic shutter speed which are set in accordance with a predetermined program are obtained (reference A6).

The electronic shutter speed associated with item (1) above is used in the distance measurement of Step 107 and the following Steps. With this shutter speed, the distance measurement is carried out during which the aperture 13 is fully open, and a focusing operation is performed. The electronic shutter speed associated item (2) above is used in the recording operation shown in FIG. 9.

In Step 107, the CCDs 16 and 17 are exposed according to the electronic shutter speed associated with item (1) above (reference A7). In Step 108, if the first field is read, pixel signals of the horizontal rows "a" (odd-numbered rows) of the first CCD 16 and pixel signals of the horizontal rows "b" (even-numbered rows) of the second CCD 17 are transmitted into the image memories 33 and 34 (reference A8). If the second field is read, pixel signals of the horizontal rows "b" (even-numbered rows) of the first CCD 16 and pixel signals of the horizontal rows "a" (odd-numbered rows) of the second CCD 17 are transmitted into the image memories 33 and 34, as described above with reference to Step 104. In Step 109, an estimated focusing value "A" is obtained using predetermined data stored in the image memories 33 and 34 (reference A9). This estimated focusing value "A" can be obtained by well known methods, such as the contrast method,—as described above.

Then, in Step 110, the focusing lens 11 is moved from the present position thereof (the X-position in FIG. 11) to a center position (the Y-position) in the infrared triangulation zone (reference A10).

Operations in Steps 111 through 114 are similar to those in Steps 107 through 110. Namely, in Step 111, while the focusing lens 11 is positioned at the Y-position, the CCDs 16 and 17 are exposed (reference A11); and, in Step 112, image signals derived from pixel signals of the CCDs 16 and 17 are transmitted into the memories 33 and 34 (reference A12). In Step 113, an estimated focusing value "B" is obtained based on data stored in the image memories 33 and 34 (reference A13). In Step 114, the focusing lens 11 is moved from the present position thereof (reference Y) to focus on position Z, corresponding to the further (with respect to the position TL) of the two positions defined by the plus and minus limits (X, Z) of the unit measurement value within the infrared distance measuring zone ZN of FIG. 11 (reference A14).

Then, similar to the above, at Step 115, while the focusing lens 11 is positioned at the Z-position, the CCDs 16 and 17 are exposed (reference A15); and in Step 116 image signals derived from pixel signals from the CCDs 16 and 17 are transmitted into the image memories 33 and 34 (reference A16). In Step 117, an estimated focusing value "C" is obtained based on data stored in the image memories 33 and 34 (reference A17).

In Step 118, the focusing lens 11 is moved to the position corresponding to the best value, i.e. the largest value, of the estimated focusing values "A", "B" and C" (reference A18), thus completing the AF operation. Note that, in the example shown in FIG. 11, the focusing lens 11 is positioned at the X-position.

Then, when the release button 41 is fully depressed (reference A21), the execution of the program of FIG. 9 is commenced.

In Step 201, the aperture 13 is opened (reference A22) to the aperture value determined by item (2) above which was obtained in Step 106 of the program of FIGS. 7 and 8, when the release button 41 was partly depressed.

In Step 202, the first and second CCDs 16 and 17 are exposed with the electronic shutter speed determined with regard to item (2) above obtained in Step 106 (reference A23). In Step 203, in the case of the first field, image signals derived from pixel signals of the horizontal rows "a" (odd-numbered rows) of the first CCD 16 and image signals derived from pixel signals of the horizontal rows "b" (even-numbered rows) of the second CCD 17 are transmitted into the image memories 33 and 34 (reference A24). In the case of the second field, pixel signals from the alternate rows with respect to those mentioned in the case of the first field, are transmitted into the image memories 33 and 34, as described above with reference Step 104.

Since the exposure in Step 202 is performed with the aperture value and the electronic shutter speed set according to the program described above, it is reasonable to expect that the proper amount of exposure would be obtained. However, since the photometry and distance measurement are performed with the aperture fully open, the amount of exposure may be in error. Therefore, in Step 204, using a predetermined range of data included in data read from the image memories 33 and 34, a correction value for the electronic shutter speed is obtained, and the aperture opening value is adjusted to the proper value (reference A25). Thus, any error in the aperture value is corrected, ti obtain the optimum electronic shutter speed.

In Step 205, the first and second CCDs 16 and 17 are exposed (reference A26) according to the optimum electronic shutter speed obtained in Step 204. This exposure is the photographing exposure, in which pixel signals corresponding to the object to be photographed are generated in the first and second CCDs 16 and 17. The pixel signals are read out from the CCDs 16 and 17 in Step 206. If the first field is read out, image signals derived from pixel signals of the horizontal rows "a" (odd-numbered rows) of the first CCD 16 and image signals derived from pixel signals of the horizontal rows "b" (even-numbered rows) of the second CCD 17 are transmitted into the image memories 33 and 34. If the second field is read out, pixel signals from alternate rows with respect to those mentioned in the case of the first field, are transmitted into the image memories 33 and 34 (reference A27).

In Step 206, while the pixel signals are being transmitted into the image memories 33 and 34, excess pixel signals accumulated in the photodiodes are discharged to the substrates of the CCDs 16 and 17. After this discharge operation is completed, the first and second CCDs 16 and 17 are exposed according to the optimum electronic shutter speed obtained in Step 204 (reference A28).

In step 207, pixel signals generated in the first and second CCDs 16 and 17 are read out. If the second field is read out, image signals derived from pixel signals of the horizontal rows "b" (odd-numbered rows) of the first CCD 16 and image signals derived from pixel signals of the horizontal rows "a" (even-numbered rows) of the second CCD 17 are transmitted into the image memories 33 and 34. If the first field is read out, pixel signals from alternate rows with respect to those mentioned in the case of the second field, are transmitted into the image memories 33 and 34 (reference A29). Thus, two field's worth of pixel signals will have been transmitted into the image memories 33 and 34.

In Step 208, the aperture 13 is set to the fully open position (reference A30). In Step 209, the pixel signals are read out from the first and second CCDs 16 and 17, and converted to an R-signal, a G-signal and a B-signal in the image signal processing circuit 36. The R-, G- and B-signals are recorded on the memory card 38 through the interface circuit 37 (reference A31). Then, the program ends.

Figure 12:
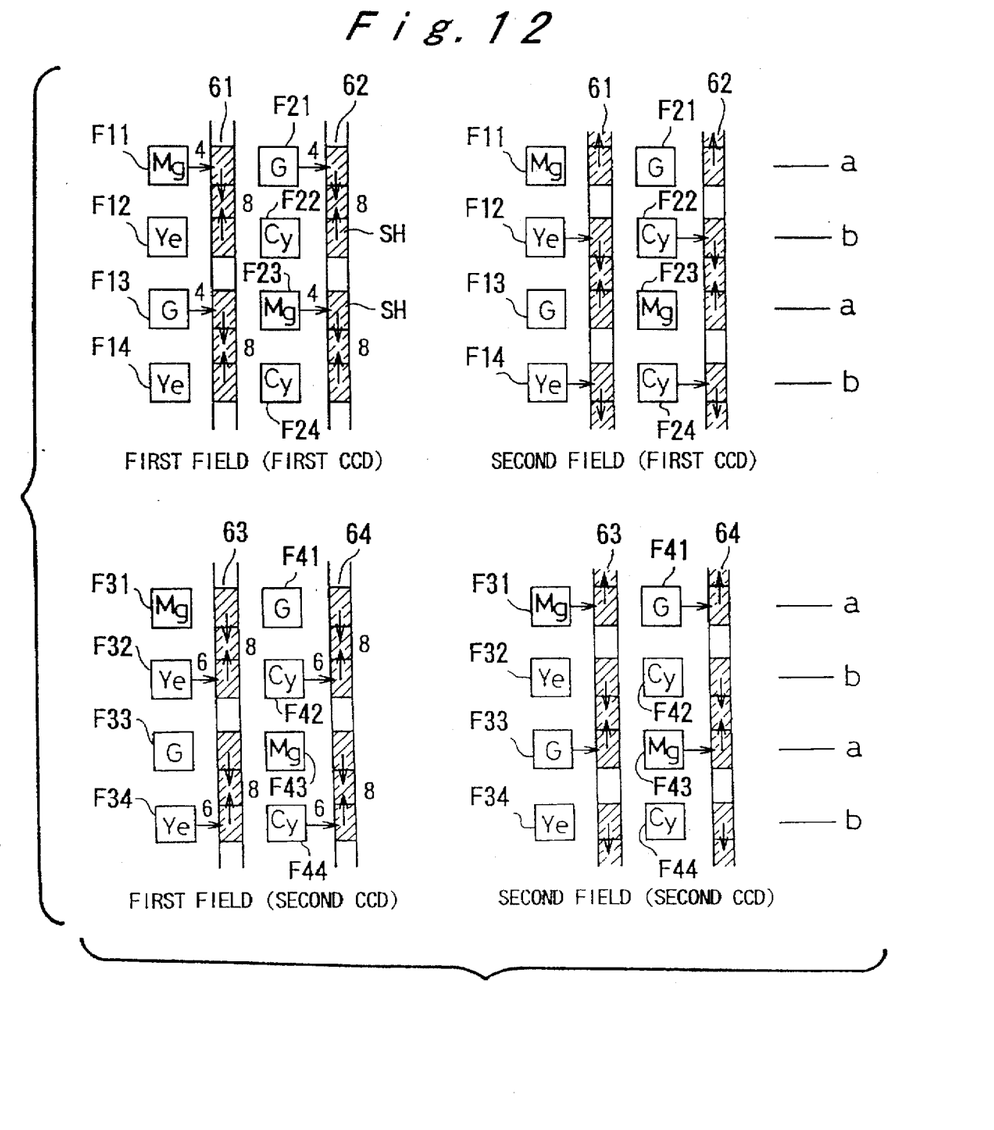
FIG. 12 is a diagram showing the transfer of pixel signals to a vertical transfer CCD in a vertical transfer operation; and, FIG. 13 is a diagram showing the relationship between a time-variation of voltage signals in a transfer operation, and a time-variation of potential wells in a vertical transfer CCD.

With reference to FIGS. 12 and 13, the pixel signal reading operation executed in the photometry measurement and the distance measurement will be described.

FIG. 12 shows the manner in which pixel signals generated in the photodiodes of the first CCD 16 are transferred to vertical transfer CCDs 61 and 62, and how the pixel signals generated in photodiodes of the second CCD 17 are transferred to vertical transfer CCDs 63 and 64. Note that, in this drawing, the hatched portions SH are potential wells, and numerals such as 4, 6 and 8 correspond to time t shown in FIG. 13.

In the transfer operation in the first field in the first CCD 16, the Mg-signal and G-signal accumulated in photodiodes F11 and F13 are transferred to the vertical transfer CCD 61, and the G-signal and Mg-signal accumulated in photodiodes F21 and F23 are transferred to the vertical transfer CCD 62. Conversely, the Ye-signal and the Cy-signal accumulated in photodiodes F12, F14, F22 and F24 are not transferred to the vertical transfer CCD 61 nor 62. Therefore, although the potential wells SH are varied, as shown by an arrow in the drawing, after the transferring operation to each vertical transfer CCD 61 and 62, the pixel signals are not added to each other, since only one kind of pixel signal exists in each potential well SH.

Similarly, in the second CCD 17, the Ye-signal accumulated in the photodiodes F32 and F34 are transferred to the vertical transfer CCD 63, and the Cy-signal accumulated in the photodiodes F42 and F44 is transferred to the vertical transfer CCD 64. Namely, the Mg-signal and the G-signal accumulated in photodiodes F31, F33, F41 and F43 are not transferred to the vertical transfer CCD 63 or 64.

The transfer operation in the second field is opposite to that in the first field with respect to each of the CCDs 16 and 17. Namely, in the first CCD 16, the Ye-signal accumulated in the photodiodes F12 and F14 is transferred to the vertical transfer CCD 61, and the Cy-signal accumulated in the photodiodes F22 and F24 are transferred to the vertical transfer CCD 62. In the second CCD 17, the Mg-signal and the G-signal accumulated in the photodiodes F31 and F33 are transferred to the vertical transfer CCD 63, and the G-signal and the Mg-signal accumulated in the photodiodes F41 and F43 are transferred to the vertical transfer CCD 64.

FIG. 13 shows a relationship between the time-variation of voltage signals supplied to the electrodes V11 through V14 to transfer pixel signals and the time-variation of potential wells in a vertical transfer CCD. Note that this drawing shows one of the states of the first field in the first CCD 16.

As shown in FIG. 13, a reading pulse (transfer gate pulse) is outputted at time t=4, so that the pixel signals are transferred from the photodiodes to the vertical transfer CCDs 61 through 64. At time t=8, voltage levels of the electrodes V11, V12 and V13 come to have the same value, so that the potential well corresponding to the electrode V1 and the potential well corresponding to the electrode V3 are combined. However, since the pixel signals exist only in the potential well corresponding to the electrode V1, the operation of adding the pixel signals is not performed (reference J).

As described above, in the embodiment, when the photometry and distance measurements are carried out using pixel signals obtained from the CCDs 16 and 17, it is not necessary to read two field's worth of pixel signals as in a conventional device. Instead, a luminance signal is obtained from one field's worth of pixel signals. Therefore, the time required for generating the luminance signal is shortened, and the subsequent photometry and distance measurements are carried out in a shorter period of time.

Although the embodiments of the present invention have been described herein with reference to the accompanying drawings, it is obvious that many modifications and changes may be made by those skilled in the art without departing from the scope of the invention. The present disclosure relates to subject matter contained in Japanese Patent Application No. 6-100532 (filed on Apr. 14, 1992) which is expressly incorporated herein, by reference, in its entirety.

We claim:

1. A control signal generating device, comprising:

a first image sensor in which a plurality of different color filter elements are arranged in rows of pixels aligned in horizontal and in vertical directions;

a second image sensor in which a plurality of different color filter elements are arranged in rows of pixels aligned in horizontal and in vertical directions, said filter elements of said second image sensor each being offset in a horizontal direction by the width of one pixel with respect to the arrangement of each of said filter elements of said first image sensor;

a first reader for reading pixel signals, corresponding to a field, outputted from each horizontal row of pixels by said first image sensor, at every alternate horizontal row;

a second reader for reading pixel signals, corresponding to said field, outputted from each horizontal row of pixels by said second image sensor, at every other alternate horizontal row, said other alternate horizontal rows read by said second reader being adjacent to said alternate horizontal rows read by said first reader; and a signal generator for generating a luminance signal for setting a photographing condition during a subsequent operation of a camera, said signal generator generating said luminance signal by adding said pixel signals, corresponding to said field, read by said first and second readers, said signal generator thereby generating said luminance signal using pixel signals of a single field at a time.

2. A device according to claim 1, wherein each of said first and second reader reads pixel signals successively row by alternate row.

3. A device according to claim 1, wherein said pixel signals outputted from said first and second image sensors form a first and a second field, said first reader reads pixel signals corresponding to odd-numbered horizontal rows numbered from a top row in said first field, and pixel signals corresponding to even-numbered horizontal rows numbered from a top row in said second field; and, said second reader reads pixel signals corresponding to even-numbered horizontal rows numbered from said top row in said first field, and pixel signals corresponding to odd-numbered horizontal rows numbered from said top row in said second field.

4. A device according to claim 1, further comprising means for performing photometry measurements based on said luminance signal outputted from said signal generator.

5. A device according to claim 1, further comprising means for performing distance measurement based on said luminance signal outputted from said signal generator.

6. The control signal generating device according to claim 1, wherein each plurality of different color filter elements of said first image sensor and said second image sensor includes a magenta filter element, a green filter element, a yellow filter element and a cyan filter element arranged in rows of pixels aligned in horizontal and in vertical directions.

7. A device according to claim 6, wherein said signal generator generates said luminance signal by adding a magenta pixel signal and a green pixel signal outputted from said first reader, with a yellow pixel signal and a cyan pixel signal output from said second reader.

8. A device according to claim 6, wherein said signal generator generates said luminance signal by adding a yellow pixel signal and a cyan pixel signal outputted from said first reader, with a magenta pixel signal and a green pixel signal output from said second reader.

9. The control signal generating device according to claim 1, wherein said luminance signal comprises an exposure control information signal for controlling an exposure operation of a camera.

10. The control signal generating device according to claim 1, wherein said luminance signal comprises a focus information signal.

11. A luminance signal generating device, comprising:

an optical element for forming first and second images from an image of an object to be photographed;

a first sensor for sensing said first image and comprising a first two-dimensional pixel array extending in horizontal and vertical directions;

a second sensor for sensing said second image and comprising a second two-dimensional pixel array extending in horizontal and vertical directions;

said first and second two-dimensional pixel arrays comprising a plurality of regularly-spaced horizontal rows of pixels wherein every alternate horizontal row comprises a plurality of pixels alternately covered by a first two different color filter elements, and every other alternate horizontal row comprises a plurality of pixels alternately covered by a second two different color filter elements;

said second two-dimensional pixel array optically co-planar with and optically offset in the horizontal direction from said first two-dimensional pixel array by a width of one pixel;

a first reader for reading first pixel signals, corresponding to a field, outputted by said first sensor, said first pixel signals being obtained from each alternate horizontal row of pixels of said first two-dimensional pixel array;

a second reader for reading second pixel signals, corresponding to said field, outputted by said second sensor, said second pixel signals being obtained from each other alternate horizontal row of pixels of said second two-dimensional pixel array; and a signal generator for generating luminance signals for setting a photographing condition during a subsequent operation of a camera, said signal generator generating said luminance signal by adding said first and said second pixel signals corresponding to said field, said signal generator thereby generating said luminance signal using pixel signals of a single field at a time.

12. The luminance signal generating device according to claim 11, wherein each plurality of different color filter elements of said first image sensor and said second image sensor includes a magenta filter element, a green filter element, a yellow filter element and a cyan filter element arranged in rows of pixels aligned in horizontal and in vertical directions.

13. The luminance signal generating device according to claim 11, wherein said luminance signal comprises an exposure control information signal for controlling an exposure operation of a camera.

14. The luminance signal generating device according to claim 11, wherein said luminance signal comprises a focus information signal.

15. In a still video camera, a method of generating luminance signals, comprising the steps of:

deriving first and second images from an object to be photographed;

filtering said first and second images with first and second color filters offset by a predetermined amount in a transverse direction of said filters, separating said first and second images into their constituent light color components;

sensing said first and second images with first and second image sensors disposed optically co-planar and outputting first and second signals, each of said first and second signals corresponding to a same video field of said first and second images sensed by said first and second image sensors;

simultaneously reading said first and second signals corresponding to the same video field, from said first and second image sensors, respectively; and generating a luminance signal for setting a photographing condition during a subsequent operation of a camera, by processing and adding said first and second signals corresponding to the same video field, said generating thereby generating said luminance signal using pixel signals of said same field.

16. The method of generating luminance signals according to claim 15, wherein said constituent light color components include a magenta component, a green component, a yellow component and a cyan component.

17. The method of generating luminance signals according to claim 15, wherein said luminance signal comprises an exposure control information signal for controlling an exposure operation of the camera.

18. The method of generating luminance signals according to claim 15, wherein said luminance signal comprises a focus information signal.

19. The method of generating luminance signals according to claim 15, wherein first and second color filters are offset in a horizontal direction by the width of one pixel of each of said first and second image sensors.

* * * * *